United States Patent
Huo et al.

(10) Patent No.: US 6,653,812 B1
(45) Date of Patent: Nov. 25, 2003

(54) SPACE VECTOR MODULATION METHODS AND STRUCTURES FOR ELECTRIC-MOTOR CONTROL

(75) Inventors: Bin Huo, Framingham, MA (US); Finbarr Moynihan, Somerville, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/066,101

(22) Filed: Jan. 31, 2002

(51) Int. Cl.$^7$ .................................................. H02P 5/34
(52) U.S. Cl. .......................... 318/801; 318/808; 363/40
(58) Field of Search .................................. 318/801, 722, 318/800, 808, 809; 363/40, 98, 95

(56) References Cited

U.S. PATENT DOCUMENTS

| | | |
|---|---|---|
| 5,483,140 A | 1/1996 | Hess et al. |
| 5,541,488 A | 7/1996 | Bansal et al. |
| 5,598,081 A | 1/1997 | Okamura et al. |
| 5,910,892 A * | 6/1999 | Lyons et al. .................... 363/98 |
| 5,994,867 A * | 11/1999 | Birk et al. ..................... 318/803 |
| 6,005,783 A | 12/1999 | Xue et al. |
| 6,163,128 A * | 12/2000 | Hiti et al. ...................... 318/722 |
| 6,201,720 B1 * | 3/2001 | Tracy et al. ................... 363/95 |
| 6,262,902 B1 | 7/2001 | Watanabe et al. |
| 6,313,599 B2 * | 11/2001 | Norrkniivila et al. .......... 363/40 |
| 6,534,949 B2 * | 3/2003 | Szczesny et al. ............. 318/801 |
| 6,541,933 B1 * | 4/2003 | Leggate et al. ............... 318/599 |

* cited by examiner

Primary Examiner—Robert E. Nappi
Assistant Examiner—Eduardo Colon-Santana
(74) Attorney, Agent, or Firm—Koppel, Jacobs, Patrick & Heybl (57) ABSTRACT

Space vector modulation methods and structures are provided that reduce feedback errors which degrade motor control performance. In particular, the rotation of a reference voltage vector $V_{ref}$ is modified as it rotates with respect to voltage vectors that each represent a respective one of converter switch states in an electric-motor control system. One embodiment modifies the reference voltage vector $V_{ref}$ as it approaches various voltage vectors and another modifies the reference voltage vector $V_{ref}$ when its magnitude is less than a predetermined magnitude.

42 Claims, 5 Drawing Sheets

$V_{ref} = V_n T_1 + V_{n+1} T_2 + V_{null} T_0$
$T_1 = T \cdot m \cdot \sin(60 - \phi)$
$T_2 = T \cdot m \cdot \sin \phi$
$T_0 = T - T_1 - T_2$

SPACE VECTOR MODULATION METHODS AND STRUCTURES FOR ELECTRIC-MOTOR CONTROL

BACKGROUND OF THE INVENTION

1. Field of the Invention

The present invention relates generally to electric motors and, more particularly, to control systems for electric motors.

2. Description of the Related Art

In many modern control systems, performance parameters (e.g., speed and torque) of electric motors (e.g., AC induction motors, brushless DC motors and synchronous motors) are controlled in accordance with space vector modulation which generates a reference voltage vector $V_{ref}$ whose angular speed determines a desired synchronous speed of a motor and whose amplitude determines a desired motor voltage.

The reference voltage vector $V_{ref}$ rotates with respect to a plurality of voltage vectors that each represent a respective one of switch states of an inverter that is coupled to the motor. The control system commands the inverter to generate patterns of the switch states as a function of the instantaneous magnitude and location of the reference voltage vector $V_{ref}$. Feedback signals are often provided to the control system by a single current sensor that is coupled to one side of the inverter.

Although space vector modulation facilitates improved control performance (e.g., less harmonic distortion) and the single current sensor reduces system costs, it has been found that these systems sometimes contain errors which degrade system performance.

BRIEF SUMMARY OF THE INVENTION

The present invention is directed to space vector modulation methods and structures that reduce feedback errors which degrade motor control performance.

The invention recognizes that these errors generally occur when feedback signals become so narrow that they cannot be accurately processed. The invention further recognizes that narrow feedback signals correspond to certain relationships between a reference voltage vector $V_{ref}$ and voltage vectors that each represent a respective one of converter switch states.

In response to these recognitions, embodiments of the invention provide space vector modulation methods and structures which modify the reference voltage vector $V_{ref}$ to thereby avoid excessively narrow feedback signals. In particular, the rotation of a reference voltage vector $V_{ref}$ is modified as it rotates with respect to voltage vectors that each represent a respective one of converter switch states in an electric-motor control system. One embodiment modifies the reference voltage vector $V_{ref}$ as it approaches various voltage vectors and another modifies the reference voltage vector $V_{ref}$ when its magnitude is less than a predetermined magnitude.

The novel features of the invention are set forth with particularity in the appended claims. The invention will be best understood from the following description when read in conjunction with the accompanying drawings.

DETAILED DESCRIPTION OF THE INVENTION

Figure 1:
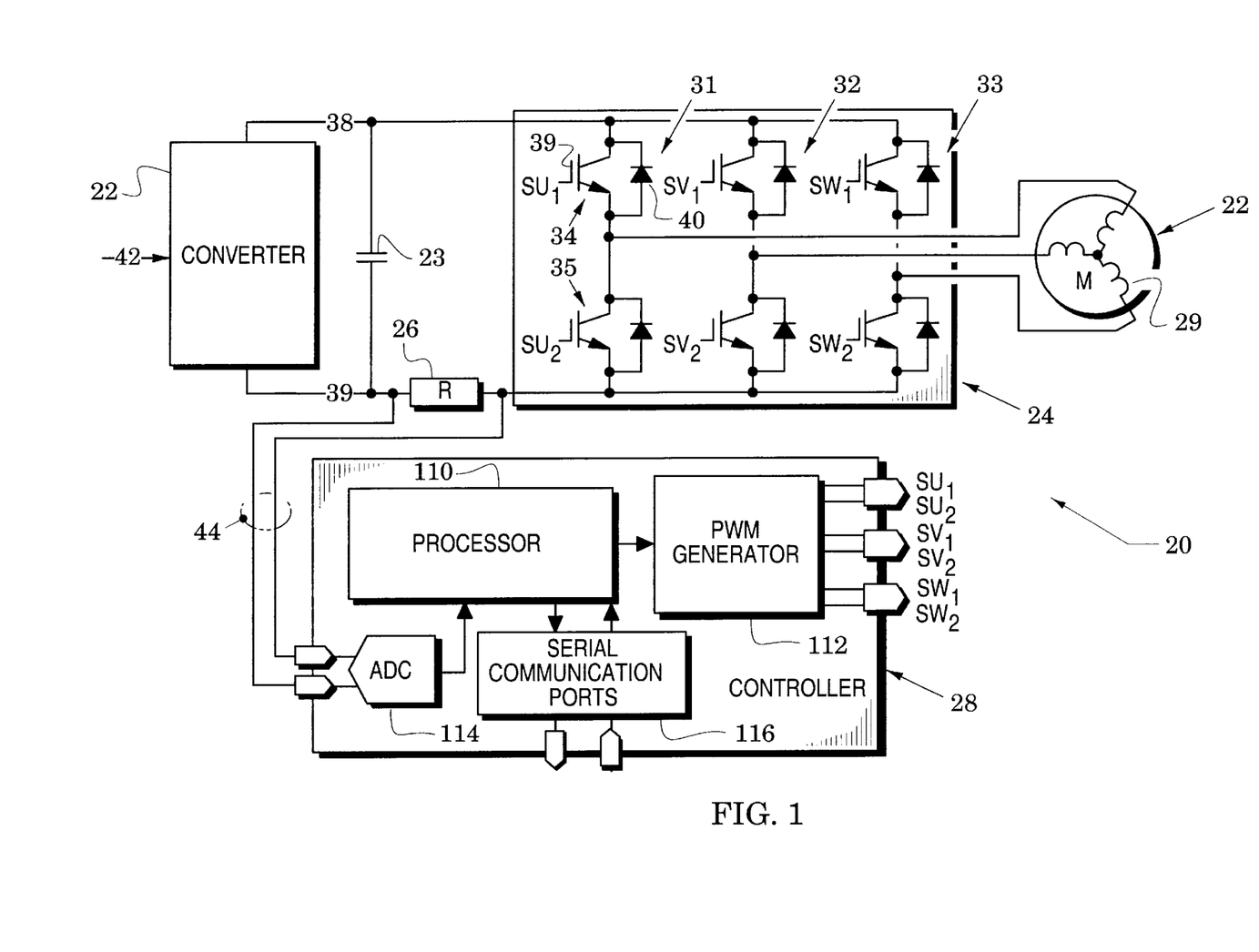
FIG. 1 is a block diagram of a motor control system of the present invention.

FIG. 1 illustrates a motor control system 20 which controls a polyphase electric motor 22. The system 20 includes a converter 22, a capacitor 23, an inverter 24, a sense resistor 26 and a controller 28. The motor 22 has an exemplary set of three stator windings 29 that are displaced (e.g., 120°) with respect to each other. Each of three half H-bridges 31, 32 and 33 is formed of a top switch 34 and a bottom switch 35 which are coupled to an end of a respective one of the windings. The state of each half H-bridge determines whether its respective winding is coupled to an upper supply voltage 38 or a lower supply voltage 39 (the top and bottom switches of any one of the half H-bridges 31, 32 and 33 are never simultaneously turned on as this would short the upper and lower supply voltages).

Although FIG. 1 shows the top and bottom switches as insulated gate bipolar transistors (IGBTs) 40 with associated free-wheeling diodes 41, they may also be formed with other power transistors (e.g., bipolar junction transistors (BJTs) and metal-oxide field effect transistors (MOSFETs)).

In operation, the converter converts an AC line signal 42 to DC energy which is stored in the capacitor 23. The DC energy can also be supplied from other appropriate sources (e.g., a battery or a DC/DC converter). The respective top and bottom switches of each winding are controlled by corresponding control signals from the controller 28 (e.g., control signals $SU_1$ and $SU_2$ are coupled to the upper and lower switches of the half H-bridge 31). The controller can thus command variable-frequency, variable-voltage polyphase waveforms and couple them to the motor windings 29.

Sensors are generally coupled to the motor 22 to provide information on its present state which is feedback to the controller 28. For example, current sensors (e.g., Hall sensors) are often coupled to two or three of the stator windings to the controller 28. In addition to being expensive, these sensors are sensitive to temperature and lack stability. Accordingly, they introduce gain and offset errors in the feedback signals which produce low-frequency harmonic currents and oscillating torque currents in the motor 22.

As a second example, sense resistors are sometimes inserted to sense currents in each of the bottom switches 35 and voltages from these resistors coupled to the controller 28. The top and bottom switches of the inverter 24 are often integrated as an intelligent power module (IPM), however, which does not provide access to the individual switch arms.

Recently, current sensor reduction techniques have been developed which facilitate the use of a single current sensor (e.g., a Hall sensor, a current transformer or a resistor) which is inserted in a DC link of the inverter 24 of FIG. 1. Because of its low cost, a resistor is preferably used and this is exemplified in FIG. 1 by the sense resistor 26 which provides a feedback signal via a feedback path 44.

In one embodiment of the invention, the motor 22 is an induction motor whose rotor carries short-circuited windings. Applying polyphase sinusoidal voltages to the stator windings 28 produce winding currents which generate, in the motor's air gap, an air gap flux $\phi_{ag}$ that rotates at a speed known as the synchronous speed $\omega_s$. The air gap flux induces an emf $E_r$ in the rotor's short-circuited windings which, in turn, drive rotor currents $I_r$ through the rotor windings. An electromagnetic torque $T_{em}$ is then generated by interaction of the air gap flux $\phi_{ag}$ and the rotor currents $I_r$.

If the rotor were to rotate at the synchronous speed $\omega_s$, there would be no relative motion between the air gap flux $\phi_{ag}$ and the rotor and, hence, no induced rotor voltages, rotor currents or electromagnetic torque $T_{em}$. Generally, however, the rotor has a rotor speed $\omega_r$ which differs from the synchronous speed $\omega_s$ by a slip speed $\omega_{sl}$. The ratio $\omega_{sl}/\omega_s$ defines a slip s and over a small range of slip values (e.g., 0 to 0.1), the electromagnetic torque $T_{em}$ and the rotor currents $I_r$ vary substantially linearly with the slip s.

When slip s is kept small, the motor speed varies approximately linearly with the synchronous speed $\omega_s$ and, hence, with the frequency of the polyphase voltage signals applied to the stator windings (28 in FIG. 1). Resistance losses in the motor are also reduced for small values of slip s. The electromagnetic torque $T_{em}$ will be maintained constant (e.g., at the motor's rated torque) at different motor speeds as long as the air gap flux $\phi_{ag}$ is kept constant and this requires that the applied stator voltages $V_s$ vary proportionally with the synchronous speed $\omega_s$.

If the induction motor were started without its controller, e.g., from AC line signal 42 of FIG. 1, the slip s would initially be large (e.g., 1) and the the rotor currents and resistance losses would grow to dangerous levels. In general, therefore, the controller 28 controls motor speed by varying the frequency of the polyphase waveforms applied to the inverter 24 and slip s is kept small by varying the voltage $V_s$ of these waveforms linearly with the frequency to thereby maintain a relatively constant air gap flux $\phi_{ag}$. This allows the motor 22 to deliver its rated torque at speeds up to its rated speed to a load that is coupled to the rotor.

In various conventional controllers, the control signals have been pulse-width modulated (PWM) polyphase signals which turn the upper and lower switches on and off to thereby synthesize the desired polyphase AC voltage waveforms that are applied to the stator windings 29. Although these polyphase signals are PWM signals, the inductances of the windings 29 integrate and smooth out these signals and the duty cycle of the PWM signals determines their instantaneous average amplitude.

It has been found, however, that PWM polyphase control signals typically generate harmonic signals which degrade motor performance by inducing harmonics in the rotor currents which generate motor torque pulsations and increased motor power losses.

Preferably, therefore, the controller 28 operates in accordance with space vector modulation which generates a reference voltage vector $V_{ref}$ whose angular speed determines the desired synchronous speed $\omega_s$ of the motor 22 and whose amplitude determines the desired rotor voltage $V_s$ that will maintain a constant air gap flux $\phi_{ag}$.

The reference voltage vector $V_{ref}$ is transformed to component vectors in a "d-q" or "space vector" coordinate system in which stator current is broken into two orthogonal components along d and q axes which rotate synchronously with the rotor flux and respectively and independently control field flux and torque current. It has been found that space vector modulation reduces the harmonic signals of PWM modulation and is more compatible with modern digital signal processing techniques.

Figure 2:
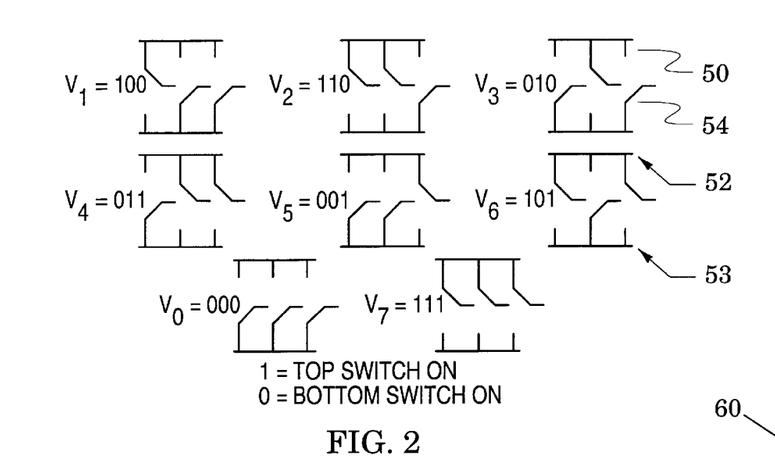
FIG. 2 is diagram of inverter states in the system of FIG. 1.

Space vector modulation treats the inverter 24 of FIG. 1 as a unit which can be driven to eight unique states that each creates a respective voltage vector. These states are shown in FIG. 2 in which vectors are expressed in terms of a 1 which indicates that a top switch (e.g., top switch 34 in FIG. 1) is turned on and a 0 which indicates that a bottom switch (e.g., bottom switch 35 in FIG. 1) is turned on. In FIG. 2, a switch off condition is indicated by a short line 50 that extends from either an upper supply voltage 52 or a lower supply voltage 53. In contrast, a switch on condition is indicated by a longer line 54 that extends down and to the right (i.e., towards the stator windings (39 in FIG. 1).

Voltage vector $V_0$, for example, shorts the stator windings because it turns on all of the bottom switches. Voltage vector $V_7$, also shorts the stator windings by turning on all of the top switches. Accordingly, voltage vectors $V_0$ and $V_7$ are called null or zero vectors because they correspond to zero voltages in the stator windings.

Voltage vector $V_1$ couples a current through a top switch to its respective stator winding and then splits that current through the other two stator windings and their respective bottom switches. Voltage vector $V_2$ passes currents from two top switches through their respective stator windings and then combines these currents into a current through the remaining stator winding and its respective bottom switch. From these examples, the switch states of the other voltage vectors are apparent from an examination of FIG. 2. It is noted that the states of one top switch and one bottom switch are changed when moving from one voltage vector to an adjacent voltage vector.

Figure 3:
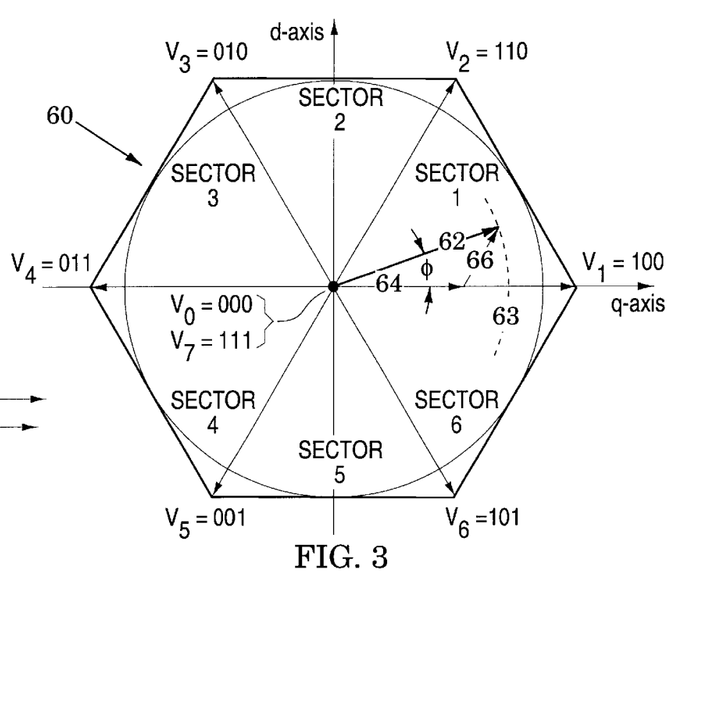
FIG. 3 is diagram of a state map which maps the inverter states of FIG. 2 onto a d-q coordinate system.

FIG. 2 thus illustrates eight inverter states and voltage vectors that represent these states. In FIG. 3, these voltage vectors are mapped onto the d-q axes of a state map 60. The null vectors $V_0$ and $V_7$ are positioned at the coordinate center, the voltage vector $V_1$ lies along the q-axis and voltage vectors $V_2$–$V_6$ are successively spaced 60° from the voltage vector $V_1$.

In operation, the controller 28 of FIG. 1 time modulates the voltage vectors to thereby generate a reference voltage vector $V_{ref}$ which rotates in a direction in which the rotor of the motor (22 in FIG. 1) turns, rotates at a frequency that determines the motor's synchronous speed $\omega_s$, and has a magnitude that determines the applied rotor voltages $V_s$ (generally selected to maintain a constant air gap flux $\phi_{ag}$). For example, FIG. 3 shows an exemplary reference voltage vector 62 in sector 1 whose instantaneous magnitude traces a vector path 63. Any instance of the reference voltage vector 62 can be created by an appropriate combination of the two currently-adjacent voltage vectors and one of the null vectors $V_0$ and $V_7$.

Figure 4:
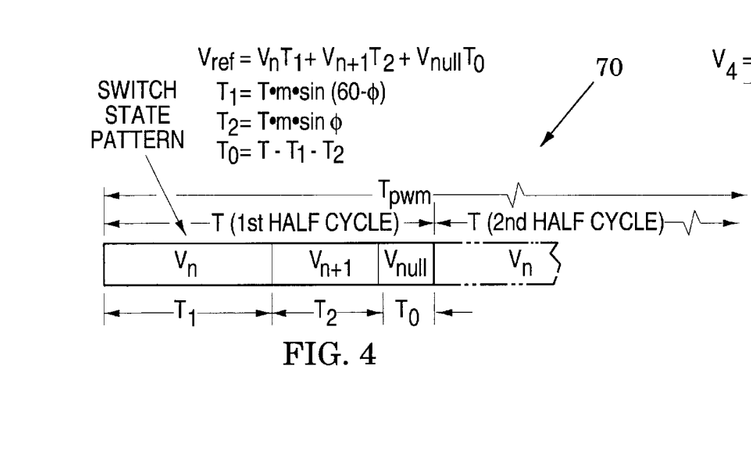
FIG. 4 is a diagram that shows patterns of the inverter states of FIG. 2 as a function of a reference voltage vector $V_{ref}$ in the state map of FIG. 3.

In the exemplary FIG. 3 position of the reference voltage vector $V_{ref}$, the voltage vectors $V_1$, $V_2$ and $V_0$ are time modulated as shown in the diagram 70 of FIG. 4 which, for generality, refers to them as voltage vectors $V_n$, $V_{n+1}$ and $V_{null}$ wherein n is the sector in which the reference voltage vector (62 of FIG. 3) is currently located. For example, FIG. 3 shows the reference voltage vector $V_{ref}$ in sector 1 so that $V_n$ and $V_{n+1}$ of the graph 70 of FIG. 4 are currently $V_1$ and $V_2$. When the reference voltage vector $V_{ref}$ passes into sector 2, $V_n$ and $V_{n+1}$ will become $V_2$ and $V_3$. In accordance with the diagram 70, the controller (28 in FIG. 1) commands the voltage vector $V_n$ to be active for a time $T_1$, the voltage vector $V_{n+1}$ to be active for a time $T_2$, and the null vector $V_{null}$ to be active for the time T of the remainder of a first half cycle.

The reference voltage vector 62 of FIG. 4 is thus formed as $$V_{ref} = V_n T_1 + V_{n+1} T_2 + V_{null} T_0 \qquad (1)$$

in which $T_1 = T \cdot m \cdot \sin(60-\theta)$, $T_2 = T \cdot m \cdot \sin\theta$ and $T_0 = T - (T_1 + T_2)$. The instantaneous modulation index is given by m and FIG. 4 indicates the angle $\theta$ as well as the vectors $V_n T_1$ and $V_{n+1} T_2$ which are shown respectively as vectors 64 and 66.

As shown in FIG. 4, a PWM time period ($T_{pwm}$) generally includes a second half cycle. The duty cycles of the first half cycle may be repeated in the second half cycle so that the switch state patterns are symmetrical about the midpoint of the time period $T_{pwm}$. In other embodiments, the switch state pattern may be updated in the second half cycle and different null vectors may be used in the different half cycles to thereby facilitate various pattern arrangements (e.g., ones that are symmetrical about the midpoint) which obtain various advantages (e.g., center alignment of switch signals, overmodulation techniques and reduced inverter switching).

The switch state patterns are thus generally commanded at a nominal switching frequency $f_{sw}$ which is the inverse of the time period $T_{pwm}$. In different motor control systems, the nominal switching frequency $f_{sw}$ is selected to enhance various system parameters. For example, lowering the switching frequency $f_{sw}$ will reduce switching losses but if lowered excessively, acoustical noise may increase to an objectionable level.

During space vector modulation operation of the motor 22 of FIG. 1, the state of various system parameters (e.g., the slip s) are detected by monitoring feedback signals (voltage pulses generated by current pulses through the sense resistor 26). As stated in the background, it has been found that such systems sometimes contain errors which degrade system performance. The invention recognizes that these errors generally occur when the voltage pulses in the state patterns (e.g., as generated in FIGS. 3 and 4) become so narrow (e.g., 5 microseconds) that the current feedback signals do not sufficiently exceed inherent noise signals.

The invention further recognizes that the voltage pulses become narrow when the reference voltage vector $V_{ref}$ is close to either of the voltage vectors $V_n$ and $V_{n+1}$. This follows because $T_1$ is close to zero when the reference voltage vector $V_{ref}$ is close to the voltage vector $V_2$ (where $\sin(60-\theta)$ approaches zero) and $T_2$ is close to zero when the reference voltage vector $V_{ref}$ is close to the voltage vector $V_1$ (where $\sin\theta$ approaches zero). The time $T_0$ is close to zero when the reference voltage vector $V_{ref}$ is close to the perimeter of the state map 60 but this situation does not degrade system performance because the time $T_0$ is not associated with a current pulse through the sense resistor (note from FIG. 2, that the null vectors short the rotor coils 39 to different ones of the supply voltages).

In response to this recognition, controller embodiments of the invention establish a predetermined distance $D_{prd}$ and when the reference voltage vector $V_{ref}$ reaches the predetermined distance $D_{prd}$ from any of the voltage vectors, they temporarily reduce the nominal switching frequency $f_{sw}$ so that a subsequently commanded switch-state pattern corresponds to a subsequent location of the reference voltage vector $V_{ref}$ that is beyond the predetermined distance $D_{prd}$.

Figure 5A:
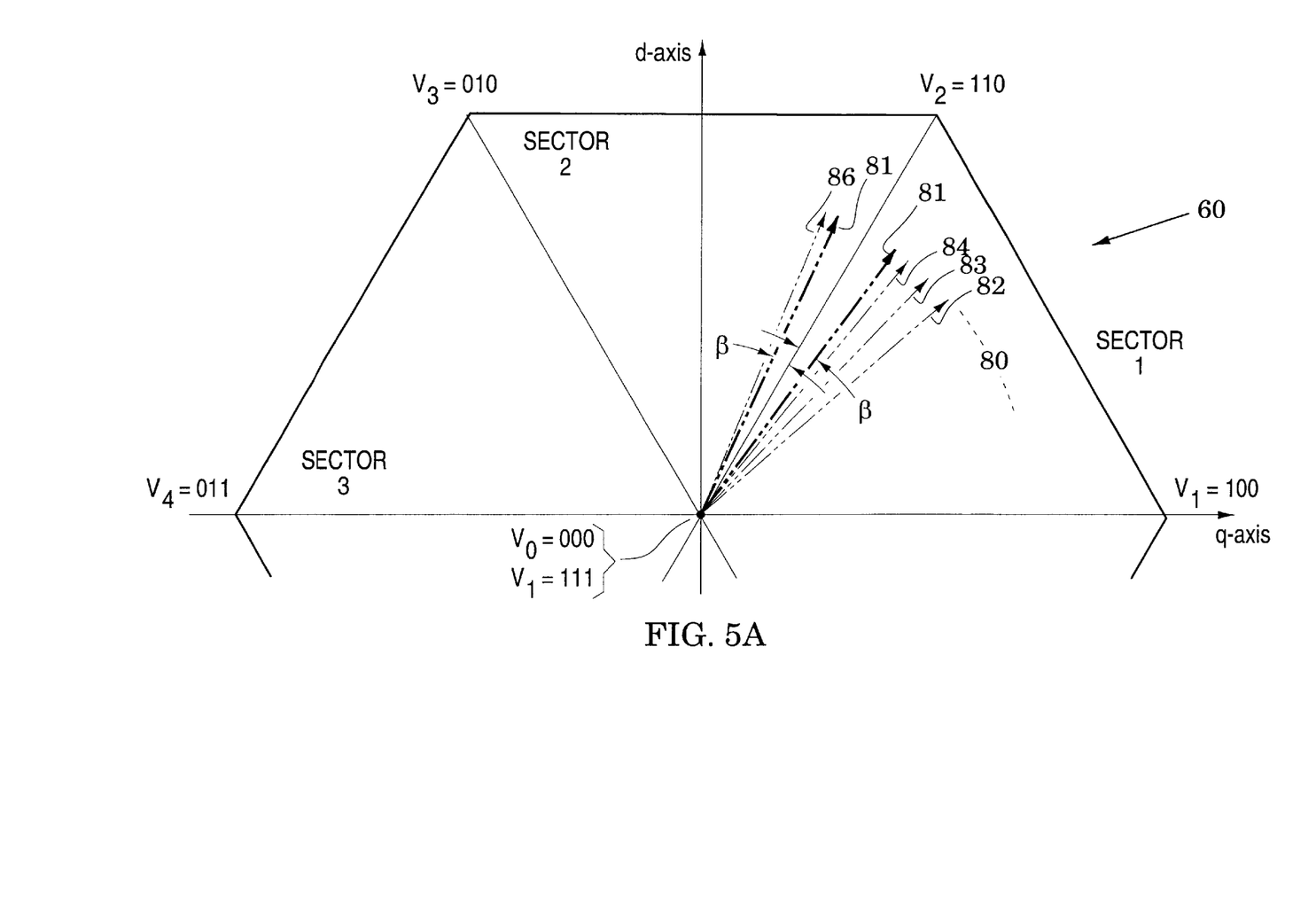
FIGS. 5A and 5B are expanded views of the upper half of the state map of FIG. 3.

To facilitate understanding of these processes, FIG. 5A illustrates an enlarged version of the upper half of the state map (60 in FIG. 3) in which the reference voltage vector $V_{ref}$ is proceeding along a path 80. In a controller embodiment associated with FIG. 5A, the predetermined distance $D_{prd}$ is a predetermined angle P which establishes limit vectors 81 on either side of the voltage vector which the reference voltage vector $V_{ref}$ is approaching (voltage vector $V_1$ in FIG. 5A). As previously described, the angular speed and amplitude of the reference voltage vector $V_{ref}$ are selected to generate the desired synchronous speed $\omega_s$ and the desired rotor voltage $V_s$ in the motor 22 of FIG. 1. The angular speed and the nominal switching frequency $f_{sw}$ determine successive values of the angle $\theta$ of FIG. 3 and, accordingly, successive angular locations such as the locations 82, 83 and 84 of the reference voltage vector $V_{ref}$ in FIG. 5A.

It is apparent that the next successive location of the reference voltage vector $V_{ref}$ will be within the predetermined angle $\beta$ from the voltage vector $V_2$ (i.e., beyond the first limit vector 81). Accordingly, the invention temporarily reduces the nominal switching frequency $f_{sw}$ to a value that substitutes the subsequent location 86 of the reference voltage vector $V_{ref}$ that is beyond the predetermined angle $\beta$ from the voltage vector $V_2$ (i.e., beyond the second limit vector 81). Subsequently, the switching frequency is returned to its nominal value. Because the average switching frequency is reduced in this temporary reduction, other embodiments of the invention temporarily further alter the switching frequency sufficiently to cause the average switching frequency to substantially equal the nominal switching frequency $f_{sw}$.

Figure 5B:
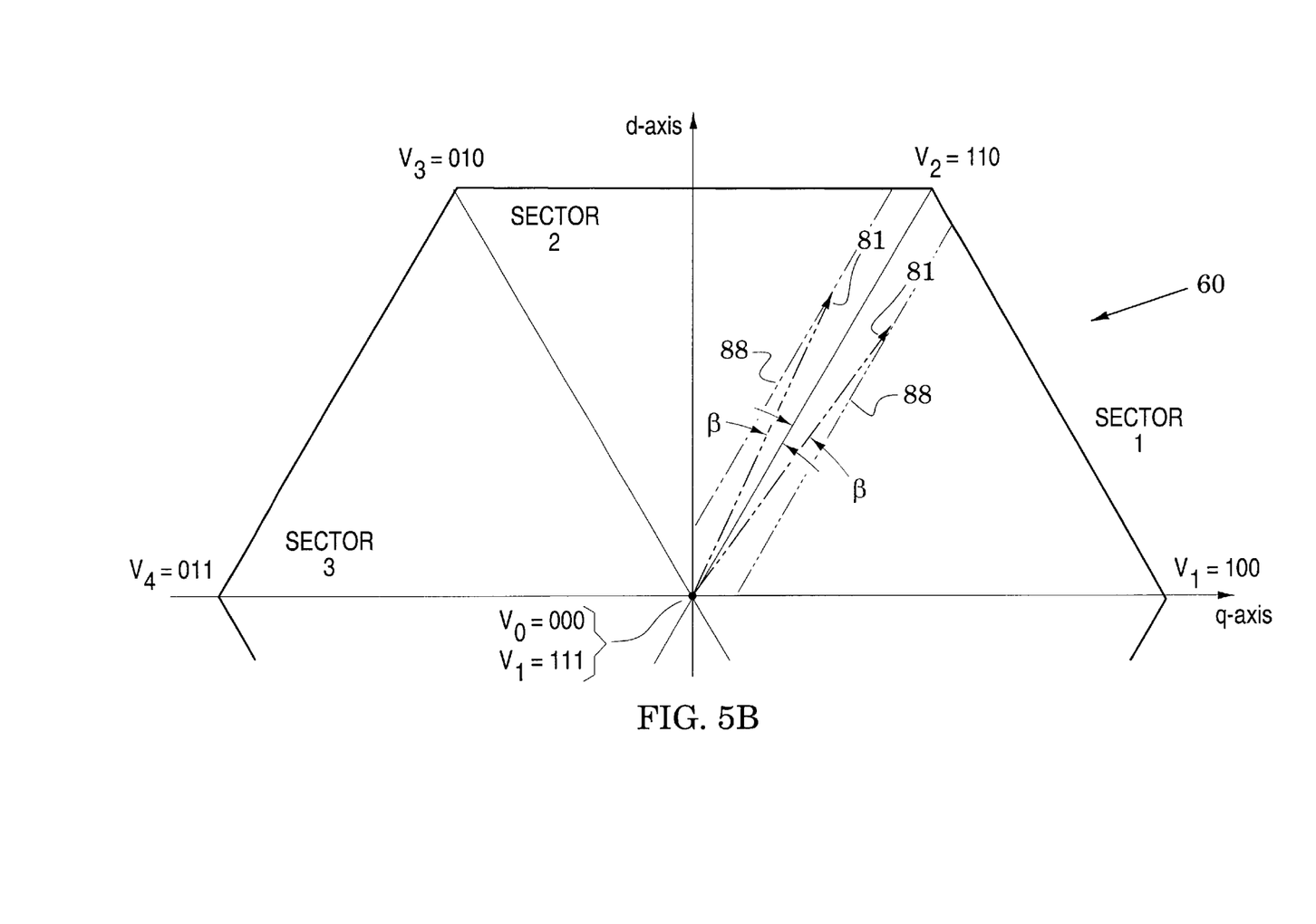

In order to enhance the control system performance, it has been found that the predetermined angle $\beta$ should generally be less than 6 degrees and that, typically, it is preferably in the range of 2–4 degrees. The predetermined distance $D_{prd}$ can be expressed as other than a predetermined angular distance. For example, FIG. 5B illustrates limit lines 88 that run through the terminations of the limit vectors 81 and are spaced from the voltage vector $V_2$ by a lateral predetermined distance $D_{prd}$. In this embodiment of the invention, the nominal switching frequency $f_{sw}$ is reduced when a successive position of the reference voltage vector $V_{ref}$ would pass the first limit line.

From the relationships of FIG. 4, the invention further recognizes that the current pulses through the current sensor 26 of FIG. 1 also become narrow when the magnitude of the reference voltage vector $V_{ref}$ is significantly reduced. This occurs when the modulation index m is significantly reduced.

Figure 6:
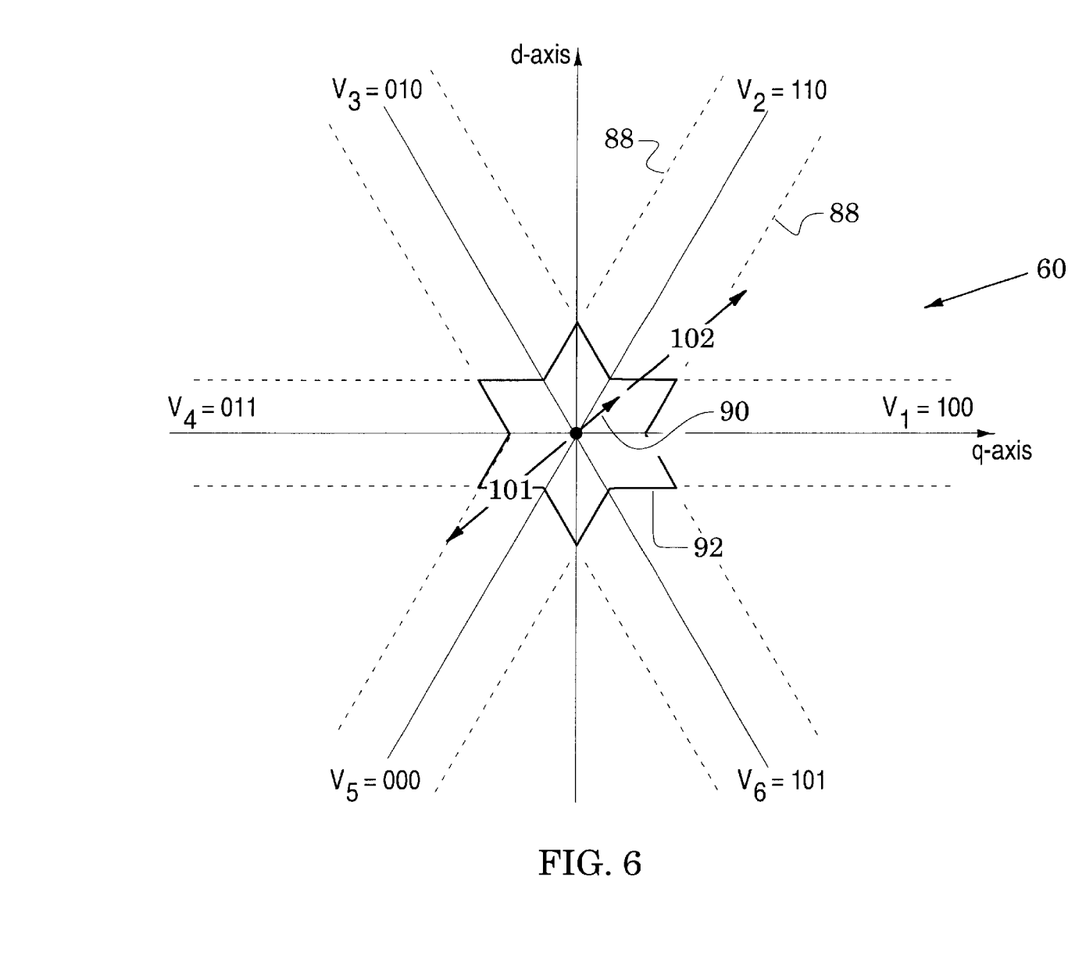
FIG. 6 is an expanded view of the center of the state map of FIG. 3.

A reduced reference voltage vector 90 is accordingly shown in FIG. 6 which is an enlarged view of the center of the state map 60 of FIG. 3. The reference voltage vector 90 has a magnitude that is less than a predetermined magnitude $M_{prd}$. In this embodiment, the predetermined magnitude $M_{prd}$ is established by a star-shaped area 92 that is defined by the intersections of the limit lines 88 of FIG. 5B when they are spaced from each of the voltage vectors $V_1$–$V_6$. In other embodiments, the predetermined magnitude $M_{prd}$ may be defined by the limits of a circle that is centered on the center of the state map 60 or by a predetermined value of the modulation index m (see FIG. 4).

In a controller embodiment of the invention, the switch state patterns are altered to correspond to a first reference voltage vector $V_{ref_{first}}$ that is directed oppositely from the reference voltage vector $V_{ref}$ and has a selected magnitude at least equal to said predetermined magnitude $M_{prd}$ and to correspond to a second reference voltage vector $V_{ref_{scnd}}$ that is directed along the reference voltage vector $V_{ref}$ and has a magnitude substantially equal to the sum of the present magnitude and the selected magnitude.

The first and second reference vectors are respectively shown as vectors 101 and 102 in FIG. 6. Because the sum of the first and second voltage vectors generates the reference voltage vector $V_{ref}$, they provide the same angular speed and amplitude as would the reference voltage vector $V_{ref}$. The nominal switching frequency $f_{sw}$ need not be disturbed as the first and second voltage vectors can be realized in the first and second half cycles (see FIG. 4) of the same time period $T_{pwm}$. The switch patterns that define the first and second reference vectors are each defined by switch states that correspond to one of said null voltage vectors and to at least one of voltage vectors that are adjacent to these reference vectors. In order to enhance the control system performance, it has been found that the predetermined modulation index should generally be less than 0.2 and that, typically, it is preferably in the range of 0.05 to 0.1.

FIG. 1 illustrates that a controller embodiment includes a processor 110, a PWM generator 112, an analog-to-digital converter (ADC) 114 and serial communication ports 116. In operation of the controller 28, current pulse feedback information from the current sensor 26 is converted to digital format by the ADC 114 and the angular speed and amplitude of the reference voltage vector $V_{ref}$ is commanded via the serial communication ports 116. The PWM generator 112 generates drive signals for the inverter switches (of the inverter 24 of FIG. 1) in response to control signals from the controller 110 and the controller generates the control signals in accordance with the teachings described above (e.g., with reference to FIGS. 5A, 5B and 6).

Although the processor 110 can be realized with various dedicated structures (e.g., an application-specific integrated circuit), it is more adaptable when realized as an appropriately programmed digital signal processor.

It has been found that the process embodiments of the invention effectively reduce system errors that are introduced by excessively narrow current feedback signals. Although embodiments of the invention have been described with reference to an AC induction motor, they may be practiced with other motors (e.g., brushless DC motors and synchronous motors).

The embodiments of the invention described herein are exemplary and numerous modifications, variations and rearrangements can be readily envisioned to achieve substantially equivaalent results, all of which are intended to be embraced within the spirit and scope of the invention as defined in the appended claims.

We claim:

1. A method for controlling an electric motor with an inverter that has a plurality of switches which can be commanded to a plurality of switch states, the method comprising the steps of;

at a nominal switching frequency $f_{sw}$, commanding said inverter to generate patterns of said switch states and associated state times as a function of the magnitude and the location of a reference voltage vector $V_{ref}$ that rotates with respect to a plurality of voltage vectors which each represent a respective one of said switch states; and when said reference voltage vector $V_{ref}$ is within a predetermined distance $D_{prd}$ from any of said voltage vectors, temporarily reducing said nominal switching frequency $f_{sw}$ so that a subsequently commanded pattern corresponds to a subsequent location of said reference voltage vector $V_{ref}$ that is beyond said predetermined distance.

2. The method of claim 1, further including the step of further temporarily altering said nominal switching frequency $f_{sw}$ to obtain an average switching frequency that substantially equals said nominal switching frequency $f_{sw}$.

3. The method of claim 2, wherein said predetermined distance $D_{prd}$ is an angular distance.

4. The method of claim 3, wherein said angular distance is in the range of 2–4 degrees.

5. The method of claim 3, wherein said angular distance is less than 6 degrees.

6. The method of claim 1, wherein said subsequent location is substantially at said predetermined distance.

7. The method of claim 1, wherein said voltage vectors include null voltage vectors and said reference voltage vector $V_{ref}$ rotates about said null voltage vectors.

8. The method of claim 1, wherein said voltage vectors include null voltage vectors and said patterns are limited to switch states that correspond to one of said null voltage vectors and to at least one of voltage vectors that are adjacent to said reference voltage vector $V_{ref}$.

9. A controller for commanding a plurality of inverter switches that can be set in a plurality of switch states for control of an electric motor, said controller comprising;

a generator that generates drive signals for said inverter switches in response to control signals; and a processor that provides control signals that:

a) at a nominal switching frequency $f_{sw}$, command said inverter switches to generate patterns of said switch states and associated state times as a function of the magnitude and the location of a reference voltage vector $V_{ref}$ that rotates with respect to a plurality of voltage vectors which each represent a respective one of said switch states; and b) when said reference voltage vector $V_{ref}$ is within a predetermined distance $D_{prd}$ from any of said voltage vectors, temporarily reduce said nominal switching frequency $f_{sw}$ so that a subsequently commanded pattern corresponds to a subsequent location of said reference voltage vector $V_{ref}$ that is beyond said predetermined distance.

10. The controller of claim 9, wherein said control signals also command said inverter switches to further temporarily alter said nominal switching frequency $f_{sw}$ to obtain an average switching frequency that substantially equals said nominal switching frequency $f_{sw}$.

11. The controller of claim 9, wherein said predetermined distance $D_{prd}$ is an angular distance.

12. The controller of claim 11, wherein said angular distance is at least 2 degrees.

13. The controller of claim 11, wherein said angular distance is in the range of 2–4 degrees.

14. The controller of claim 11, wherein said angular distance is less than 6 degrees.

15. The controller of claim 9, wherein said processor responds to selected magnitudes and rotation rates for said reference voltage vector $V_{ref}$.

16. The controller of claim 15, further including a sense resistor coupled to said inverter switches and wherein said processor adjusts said patterns to realize a magnitude and location of said reference voltage vector $V_{ref}$ that corresponds to said selected magnitudes and rotation rates.

17. The controller of claim 9, wherein said subsequent location is substantially at said predetermined distance.

18. The controller of claim 9, wherein said voltage vectors include null voltage vectors and said reference voltage vector $V_{ref}$ rotates about said null voltage vectors.

19. The controller of claim 9, wherein said voltage vectors include null voltage vectors and said patterns are limited to switch states that correspond to one of said null voltage vectors and to at least one of voltage vectors that are adjacent to said reference voltage vector $V_{ref}$.

20. The controller of claim 9, wherein said switches are insulated gate bipolar transistors.

21. An electric-motor control system, comprising:
an inverter which has a plurality of switches that can be commanded to a plurality of switch states; and
a controller that:
  a) at a nominal switching frequency $f_{sw}$, commands said inverter to generate patterns of said switch states and associated state times as a function of the magnitude and the location of a reference voltage vector $V_{ref}$ that rotates with respect to a plurality of voltage vectors which each represent a respective one of said switch states; and
  b) when said reference voltage vector $V_{ref}$ is within a predetermined distance $D_{prd}$ from any of said voltage vectors, temporarily reduces said nominal switching frequency $f_{sw}$ so that a subsequently commanded pattern corresponds to a subsequent location of said reference voltage vector $V_{ref}$ that is beyond said predetermined distance.

22. The system of claim 21, wherein said controller further temporarily alters said nominal switching frequency $f_{sw}$ to obtain an average switching frequency that substantially equals said nominal switching frequency $f_{sw}$.

23. The system of claim 21, wherein said predetermined distance $D_{prd}$ is an angular distance.

24. The system of claim 21, wherein said angular distance is less than 6 degrees.

25. The system of claim 23, wherein said angular distance is in the range of 2–4 degrees.

26. The system of claim 21, wherein said subsequent location is substantially at said predetermined distance.

27. The system of claim 21, wherein said voltage vectors include null voltage vectors and said reference voltage vector $V_{ref}$ rotates about said null voltage vectors.

28. The system of claim 21, wherein said voltage vectors include null voltage vectors and said patterns are limited to switch states that correspond to one of said null voltage vectors and to at least one of voltage vectors that are adjacent to said reference voltage vector $V_{ref}$.

29. A method for controlling an electric motor with an inverter that has a plurality of switches which can be commanded to a plurality of switch states, the method comprising the steps of;
  at a nominal switching frequency $f_{sw}$, commanding said inverter to generate patterns of switch states and associated state times as a function of the magnitude and the location of a reference voltage vector $V_{ref}$ that rotates with respect to a plurality of voltage vectors which each represent a respective one of said switch states; and
  when said reference voltage vector $V_{ref}$ has a present magnitude less than a predetermined magnitude $M_{prd}$, altering said patterns to correspond to a first reference voltage vector $V_{ref_{first}}$ that is directed oppositely from said reference voltage vector $V_{ref}$ and has a selected magnitude at least equal to said predetermined magnitude $M_{prd}$ and to correspond to a second reference voltage vector $V_{ref_{scnd}}$ that is directed along said reference voltage vector $V_{ref}$ and has a magnitude substantially equal to the sum of said present magnitude and said selected magnitude.

30. The method of claim 29, wherein said reference voltage vector $V_{ref}$ has a magnitude that corresponds to a modulation index and said predetermined magnitude $M_{prd}$ corresponds to a modulation index in the range of 0.05 to 0.1.

31. The method of claim 29, wherein said reference voltage vector $V_{ref}$ has a magnitude that corresponds to a modulation index and said predetermined magnitude $M_{prd}$ corresponds to a modulation index less than 0.2.

32. The method of claim 29, wherein said voltage vectors include null voltage vectors, patterns that correspond to said first reference voltage vector $V_{ref_{first}}$ are limited to switch states that correspond to one of said null voltage vectors and to at least one of voltage vectors that are adjacent to said first reference voltage vector $V_{ref_{first}}$, and patterns that correspond to said second reference voltage vector $V_{ref_{scnd}}$ are limited to switch states that corresponds to one of said null voltage vectors and to at least one of voltage vectors that are adjacent to said second reference voltage vector $V_{ref_{scnd}}$.

33. A controller for commanding a plurality of inverter switches that can be set in a plurality of switch states for control of an electric motor, said controller comprising;
  a generator that generates drive signals for said inverter switches in response to control signals; and
  a processor that provides control signals that:
    a) at a nominal switching frequency $f_{sw}$, command said inverter to generate patterns of switch states and associated state times as a function of the magnitude and the location of a reference voltage vector $V_{ref}$ that rotates with respect to a plurality of voltage vectors which each represent a respective one of said switch states; and
    b) when said reference voltage vector $V_{ref}$ has a present magnitude less than a predetermined magnitude $M_{prd}$, alters said patterns to correspond to a first reference voltage vector $V_{ref_{first}}$ that is directed oppositely from said reference voltage vector $V_{ref}$ and has a selected magnitude at least equal to said predetermined magnitude $M_{prd}$ and to correspond to a second reference voltage vector $V_{ref_{scnd}}$ that is directed along said reference voltage vector $V_{ref}$ and has a magnitude substantially equal to the sum of said present magnitude and said selected magnitude.

34. The controller of claim 33, wherein said reference voltage vector $V_{ref}$ has a magnitude that corresponds to a modulation index and said predetermined magnitude $M_{prd}$ corresponds to a modulation index in the range of 0.05 to 0.1.

35. The controller of claim 33, wherein said reference voltage vector $V_{ref}$ has a magnitude that corresponds to a modulation index and said predetermined magnitude $M_{prd}$ corresponds to a modulation index less than 0.2.

36. The controller of claim 33, wherein said voltage vectors include null voltage vectors, patterns that correspond to said first reference voltage vector $V_{ref_{first}}$ are limited to switch states that correspond to one of said null voltage vectors and to at least one of voltage vectors that are adjacent to said first reference voltage vector $V_{ref_{first}}$, and patterns that correspond to said second reference voltage vector $V_{ref_{scnd}}$ are limited to switch states that correspond to one of said null voltage vectors and to at least one of voltage vectors that are adjacent to said second reference voltage vector $V_{ref_{scnd}}$.

37. The controller of claim 33, wherein said processor responds to selected magnitudes and rotation rates for said reference voltage vector $V_{ref}$.

38. The controller of claim 33, further including a sense resistor coupled to said inverter switches and wherein said processor adjusts said patterns to realize a magnitude and location of said reference voltage vector $V_{ref}$ that corresponds to said selected magnitudes and rotation rates.

39. An electric-motor control system, comprising:
an inverter which has a plurality of switches that can be commanded in a plurality of switch states; and
a controller that can be programmed to:
  a) at a nominal switching frequency $f_{sw}$, command said inverter to generate patterns of switch states and associated state times as a function of the magnitude and the location of a reference voltage vector $V_{ref}$ that rotates with respect to a plurality of voltage vectors which each represent a respective one of said switch states; and b) when said reference voltage vector $V_{ref}$ has a present magnitude less than a predetermined magnitude $M_{prd}$, alter said patterns to correspond to a first reference voltage vector $V_{ref_{first}}$ that is directed oppositely from said reference voltage vector $V_{ref}$ and has a selected magnitude at least equal to said predetermined magnitude $M_{prd}$ and to correspond to a second reference voltage vector $V_{ref_{scnd}}$ that is aligned with said reference voltage vector $V_{ref}$ and has a magnitude substantially equal to the sum of said present magnitude and said selected magnitude.

40. The system of claim 39, wherein said reference voltage vector $V_{ref}$ has a magnitude that corresponds to a modulation index and said predetermined magnitude $M_{prd}$ corresponds to a modulation index in the range of 0.05 to 0.1.

41. The system of claim 39, wherein said reference voltage vector $V_{ref}$ has a magnitude that corresponds to a modulation index and said predetermined magnitude $M_{prd}$ corresponds to a modulation index less than 0.2.

42. The system of claim 39, wherein said voltage vectors include null voltage vectors, patterns that correspond to said first reference voltage vector $V_{ref_{first}}$ are limited to switch states that correspond to one of said null voltage vectors and to at least one of voltage vectors that are adjacent to said first reference voltage vector $V_{ref_{first}}$, and patterns that correspond to said second reference voltage vector $V_{ref_{scnd}}$ are limited to switch states that correspond to one of said null voltage vectors and to at least one of voltage vectors that are adjacent to said second reference voltage vector $V_{ref_{scnd}}$.

\* \* \* \* \*